United States Patent
Bastide et al.

(10) Patent No.: US 11,816,171 B2
(45) Date of Patent: Nov. 14, 2023

(54) ONLINE OUTREACH-BASED REWARD MODEL GENERATION FOR USER INFORMATION SEARCH

(71) Applicant: International Business Machines Corporation, Armonk, NY (US)

(72) Inventors: Paul R. Bastide, Boxford, MA (US); Aris Gkoulalas-Divanis, Waltham, MA (US); Jonathan Dunne, Dungarvan (IE); O'Crowley B. Andrew, Dublin (IE)

(73) Assignee: IBM Corporation, Armonk, NY (US)

( * ) Notice: Subject to any disclaimer, the term of this patent is extended or adjusted under 35 U.S.C. 154(b) by 202 days.

(21) Appl. No.: 15/847,516

(22) Filed: Dec. 19, 2017

(65) Prior Publication Data
US 2019/0188327 A1    Jun. 20, 2019

(51) Int. Cl.
*G06F 16/9535*    (2019.01)

(52) U.S. Cl.
CPC ................ *G06F 16/9535* (2019.01)

(58) Field of Classification Search
None
See application file for complete search history.

(56) References Cited

U.S. PATENT DOCUMENTS

| | | | |
|---|---|---|---|
| 7,069,427 B2 | 6/2006 | Adler et al. | |
| 8,019,689 B1 | 9/2011 | Nachenberg | |
| 8,712,789 B2 | 4/2014 | Stibel et al. | |
| 8,875,284 B1 | 10/2014 | Newstadt | |
| 8,938,500 B1 * | 1/2015 | Acharya | G06Q 50/01 709/204 |
| 9,015,802 B1 | 4/2015 | Muthusrinivasan | |
| 9,449,078 B2 | 9/2016 | Wang et al. | |
| 9,477,737 B1 | 10/2016 | Charyk et al. | |
| 10,430,477 B2 * | 10/2019 | Lee | H04L 67/306 |
| 2002/0133365 A1 | 9/2002 | Grey et al. | |
| 2005/0086112 A1 | 4/2005 | Shkedi | |
| 2005/0105719 A1 | 5/2005 | Hada | |
| 2009/0043691 A1 | 2/2009 | Kasower | |
| 2010/0106557 A1 | 4/2010 | Buss | |

(Continued)

FOREIGN PATENT DOCUMENTS

WO    WO-2001059733 A2    8/2001

OTHER PUBLICATIONS

Krishnamurthy et al., "On the Leakage of Personally Identifiable Information Via Online Social Networks", 2001, ACM, 16 pages.

(Continued)

*Primary Examiner* — Kris E Mackes
*Assistant Examiner* — Cao D Vuong
(74) *Attorney, Agent, or Firm* — Steven L. Nichols; Fabian VanCott LLC (57) ABSTRACT

Online outreach based reward model generation is described. A set of features that are indicative of an online outreach for a user are determined, the online outreach originating from a particular online network. Based on this set of features, an online outreach for the user originating from the particular online network is determined. A reward model is derived from the online outreach for the user. The reward model indicates locations within the particular online network that are to be searched for user information.

20 Claims, 7 Drawing Sheets

(56) References Cited

U.S. PATENT DOCUMENTS

| | | | | |
|---|---|---|---|---|
| 2011/0078004 | A1* | 3/2011 | Swanson, Sr. | G06Q 30/02 |
| | | | | 705/14.13 |
| 2013/0073976 | A1* | 3/2013 | McDonald | G06F 16/9577 |
| | | | | 715/739 |
| 2014/0214895 | A1* | 7/2014 | Higgins | G06F 16/9535 |
| | | | | 707/770 |
| 2015/0242872 | A1* | 8/2015 | Mazzoleni | G06Q 30/0217 |
| | | | | 705/14.13 |
| 2015/0317398 | A1* | 11/2015 | Phillips | H04L 67/306 |
| | | | | 707/734 |
| 2016/0086222 | A1* | 3/2016 | Kurapati | G06Q 30/0204 |
| | | | | 705/14.53 |
| 2016/0335263 | A1* | 11/2016 | Yin | G06N 20/20 |
| 2018/0039647 | A1* | 2/2018 | Winstanley | G06F 16/9535 |
| 2018/0336280 | A1* | 11/2018 | Yin | G06F 16/2455 |

OTHER PUBLICATIONS

S.D. Jacka, "Optimal stopping and the American Put", Apr. 1991, Wiley Online Library, vol. 1, Issue 2, 3 pages, http://onlinelibrary.wiley.com/doi/10.1111/j.1467-9965.1991.tb00007.x/full.

GDPR Portal: Site Overview, http://www.eugdpr.org/. 1 page (printed Dec. 19, 2017).

WIkipedia, "General Data Protection Regularion", https://en.wikipedia.org/wiki/General_Data_Protection_Regulation, 5 pages (printed Dec. 19, 2017).

* cited by examiner

ONLINE OUTREACH-BASED REWARD MODEL GENERATION FOR USER INFORMATION SEARCH

BACKGROUND

The present invention relates to the identification of user information, and more specifically performing an effective search for user information by relying on a reward model. In today's society, large amounts of information can be disseminated via online networks. Such online networks are wide in variety. For example, social networks, commercial corporation networks, institutional networks, and others all allow information to be disseminated, in some cases across different online networks. In some cases, user information is shared within these online networks.

SUMMARY

According to an embodiment of the present invention, a computer-implemented method for generating an online outreach-based reward model is described. According to the method a set of features are determined which are indicative of an online outreach, originating from a particular online network, for a user. Based on this set of features, the online outreach for the user originating from the particular online network is determined. Based on this online outreach, a reward model is derived. The reward model indicates locations within the particular online network to search for user information.

The present specification also describes a system. The system includes a feature identifier to determine a set of features which are indicative of an online outreach, originating from a particular online network, for a user. An outreach analyzer of the system, determines, based on the set of features an online outreach for the user originating from the particular online network. A model generator of the system derives a reward model based on the online outreach for the user. The reward model indicates locations within the online network to search for user information. A search device of the system searches for user information on the particular online network based on the reward model.

The present specification also describes a computer program product. The computer program product includes a computer readable storage medium having program instructions embodied therewith. The program instructions are executable by a processor to cause the processor to 1) determine a set of features which are indicative of an online outreach, originating from a particular online network, for a user and 2) determine, based on the set of features, the online outreach for the user originating from the particular online network. The program instructions are also executable by a processor to cause the processor to 1) derive a reward model based on the online outreach for the user and 2) search for user information on the particular online network based on the reward model. Still further, the program instructions are executable by a processor to cause the processor to receive user feedback regarding results of the search and update the reward model and search parameters based on the results.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to userize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, online networks are expanding in their ability to provide services and information to their users. This information can be disseminated globally in any variety of forms. For example, social networks allow users to share information with people on the other side of the world. News outlets use online networks to distribute the news of the day as well as to allow the public to post, and comment on different stories, thus resulting in a more interconnected citizenry. In some examples, organizations, vie these online networks have access to large amounts of user data. For example, social networks, may include profile information as well as remarks made by those users which remarks can carry metadata or other information related to its users. As yet another example, businesses during online electronic transactions, acquire user information for a purchaser of a product or service. While such online networks clearly have a role in modern society and provide great benefit to people everywhere, some aspects of these online networks can be problematic. For example, these online networks can be hacked. When this occurs, the information stored thereon, including the user data of users of that network, may be exposed. Moreover, when a user elects to opt out of using a particular online network, such as a social network, that data may remain, despite the user's wish to have such user information scrubbed. One challenge in the relation of the removal of this user information from an online network, is to understand the permeation of such data within the online network. Accordingly, given the wealth of online networks and their ability to interoperate with one another, the present specification provides an advanced method to detect the level of online outreach for a user. With such outreach determined, remedial action can be taken.

Accordingly, the present specification describes a system wherein a user's online outreach is determined, which online outreach refers to the scope to which a user has participated in, and thus had their information disseminated across, a particular online network. With the online outreach determined, a reward model is derived, which reward model assists in the search, and in some cases removal, of user information from the online network and other online networks. That is, the reward model defines the most likely locations where such user information is to be found within an online network and in some cases other online networks. This user information reward system is used to formulate a search strategy for such user information. This search strategy is then used to search for, and in some cases, delete the user information on the online network. In some cases, the system can be implemented with machine-learning capabilities to enhance search results.

In summary, such a system and method 1) focuses a search for user information to those locations most likely to contain such information; 2) enhances the efficiency of searches by avoiding searching in areas that are not likely to yield user information; and 3) tailors the search to the actions of a specific user. However, it is contemplated that the devices disclosed herein may address other matters and deficiencies in a number of technical areas.

As used in the present specification and in the appended claims, the term "text classification framework" refers to a system that is used to classify and/or summarize a text message. Examples of text classification frameworks include, but are not limited to, a Naïve-Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

As used in the present specification and in the appended claims, the term "online outreach" refers to the degree to which an individual interacts via an online network. An online network includes social, and other, networks. For example, a user that has a social network profile but does not interact much, i.e., share, post, like, etc., may be said to have a relatively small online outreach. By comparison, a user who has a social network profile, is connected to many people, and regularly shares posts, comments, on other user's posts, and likes other people's posts may be said to have a larger online outreach.

Further, as used in the present specification and in the appended claims, the term "reward model" refers to a model that defines a strategy to obtain a successful outcome to a series of events or processes. For example, in the present specification, a reward model refers to a model that defines a strategy to obtain a piece of user information for a user.

Even further, as used in the present specification and in the appended claims, the term "a number of" or similar language is meant to be understood broadly as any positive number including 1 to infinity.

Figure 1:
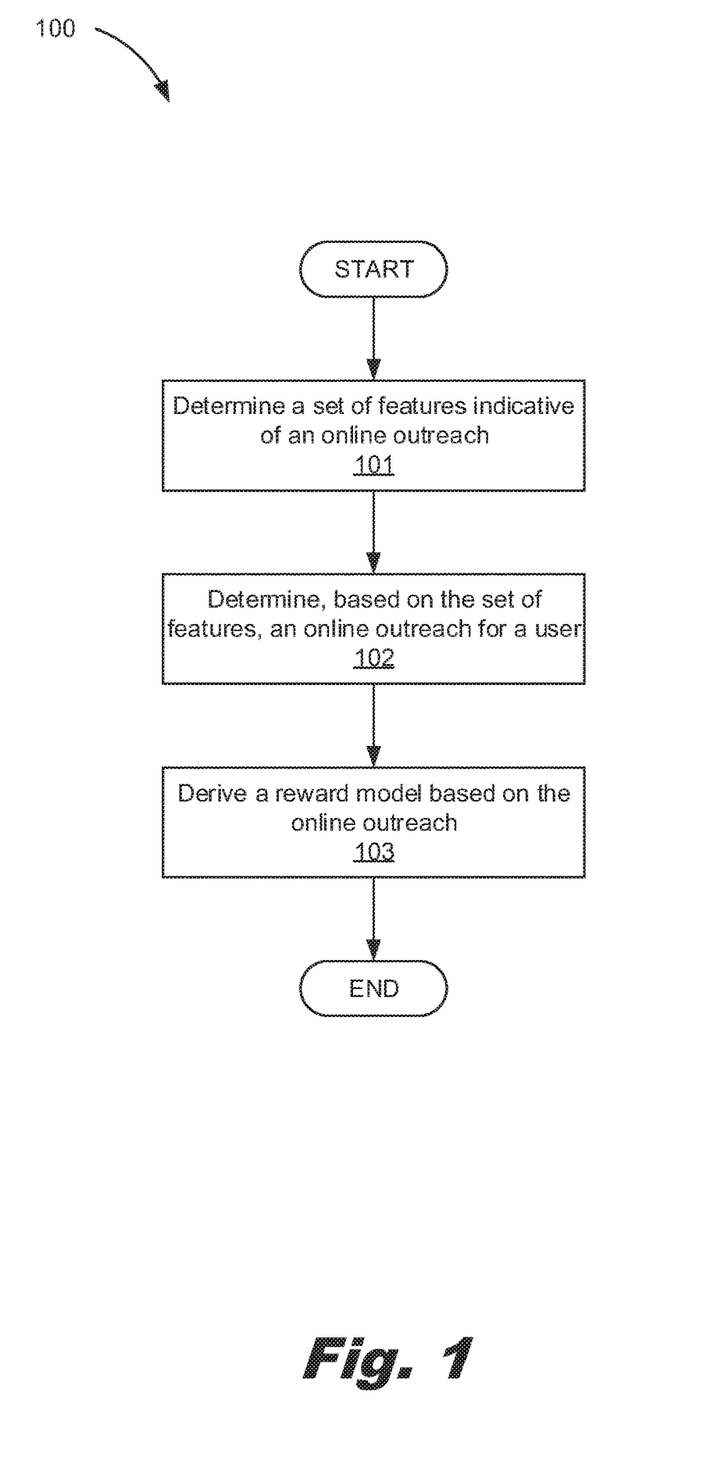
FIG. 1 depicts a flowchart of a method for generating an online-outreach-based reward model for user information search, according to an example of principles described herein.

Turning now to the figures, FIG. 1 depicts a flowchart of a method (100) for generating an online outreach-based reward model for user information search, according to an example of principles described herein. As described above, the online outreach of a user refers to that user's footprint within a particular online network, and in some cases to other online networks. For example, a user that regularly visits a social network and regularly interacts with the services provided by that network and users on that network may be said to have a relatively large online outreach. According to the method, a set of features are determined (block 101), which features are indicative of an online outreach. That is, certain characteristics of a user may indicate an extent to which a user participates on the particular online network and other online networks. Examples of features that could be used to indicate a user's online outreach include, but are not limited to, a user's connections to other users or entities and/or presences within the online network, connection types, network interaction, and network interconnectedness. For example, a user within a social network may be connected to many other users. The quantity of connections are indicative that a user has a large outreach on the particular online network. Accordingly, the system can collect metadata relating to the connections of a user as well as the quantity of connections and use this information to, at least in part, determine a user's online outreach. Another example, of a feature that is indicative of a user's online outreach is the type of connections that a user has. For example, certain types of connections are more likely to be avenues through which a user's user information is shared. For example, close friends or family may be more likely to share information related to the user via shares of the user's communications, likes of the user's communications, and commenting on that user's communications. By comparison, connections that are professional may not result in such involved interaction. Accordingly, the system may extract metadata that indicates a type of connection, or may include a machine-learning module that determines the type of connection, which is one feature by which an online outreach for a user is determined.

Another example of a feature indicative of online outreach is a user's network interaction. That is, the degree to which a user uses the services provided by the online network. For example, a user that posts regularly to a social networking site, or that regularly shares and/or likes posts of others to the social networking site is likely to have a larger online outreach, meaning that that person's user information is more engrained in the social networking site due to their user information being associated with each share, post, like, and other network interaction. In one example, the level of network interaction may relate to a potency of the user's interaction. For example, a user may not be active in terms of a number of postings, however, their level of activity may be considered high when their posts are disseminated widely, i.e., shared and/or liked, throughout the online network.

Yet another example, of a feature indicative of online outreach is a network connectedness. For example, online networks may interoperate with one another such, that a user may like, or share, a post from one online network to another. Accordingly, if a user is active in one online network, the connectedness of that particular online network to another may result in a greater online outreach for that user. While specific reference is made to particular features that are indicative of an online outreach, other features may be used which are indicative of an online outreach for a user. Some additional examples of features that may be determined (block 101) to be indicative of an online outreach for a user include, age, gender, existence of account on online network, regularity of posts, regularity of shares, number of followers, number of users followed, list of names, group affiliations on the online network, number of contacts, and characteristics of those contacts.

In some examples, the features that are determined (block 101) to be indicative of an online outreach for a user may be different based on the online network. That is, different online networks may employ different features to determine the outreach of a particular user.

With the list of features determined (block 101), a user's actual online outreach is determined (block 102). That is, in block 101, the features that are indicative of a user's outreach are determined, and in block 102, values associated with those features for a particular user are determined such that that user's online outreach can be calculated. For example, a user's quantity of connections, types of connections, level of interaction, type of interaction, and frequency of interaction can be used to determine how far into the online network, the user's user information is likely to extend.

With this online outreach determined (block 102), a reward model for the user's online outreach can be derived (block 103). As described above, the reward model indicates locations within the particular online network, and in some cases beyond the particular online network to other online networks, to be searched. Specifically, the reward model determines those locations where information for a user is likely to be found. For example, certain types of connections of a user may hold a greater potential for the dissemination of user information. For example, a user's familial relationships or a user's purchase information may be more likely to hold user information for the user, than an email newsletter subscription. Additionally, in some examples in addition to indicating locations on the particular online network where user information is likely to be located, the reward model may indicate locations outside of the particular online network where user information is likely to be found. For example, the reward model may determine that a particular connection of the user has historically shared information from a first online network to a second online network. Accordingly, the reward model could indicate that in addition to searching a node within the particular online network associated with the particular connection, the search could expand to a node within the second online network.

Within a reward model, each node, which may be a location where user information is potentially stored, has a payoff distribution. A searcher has a prior distribution of success for each location, i.e., whether information was found. The operation of the reward model is to increase the expected discounted reward. Following a search, a model generator has posterior distribution. This may be referred to as the state of the location.

In some examples, the reward model may be derived (block 103) based on additional information. For example, certain privacy settings for a user with respect to the particular online network may be considered. For example, a user may set access settings indicate that certain nodes, may not access their information. Accordingly, rather than scour these nodes for information, the reward model may be used to set search parameters that bypass this node. As a specific example, a user within a social network may indicate that particular connections cannot share their network posts or share their user information. Accordingly, the search parameters may be adjusted such that these nodes, i.e., connections, are bypassed.

From this reward model, a search for user information on the particular online network, and other online networks, can be enhanced. For example, the online network may be represented as a graph structure with nodes and edges with the nodes being locations where a user's user information may be found and an edge being a connection between nodes. For example, a node may include a location where a reproduction of network post on a blog is located, another node may be a location where that network post has been shared, and an edge is a mapping from the original network post to the shared network post. The reward model indicates which nodes, and which edges are likely to include information related to the user. For example, rather than executing a level-order traversal of the online network, which could be very time-consuming, processor heavy, and costly, a subset of the nodes and edges that are most likely to result in the identification of user information for a user may be identified. That is, the reward model may identify those nodes that are not likely to contain user information such that any subsequent search for user information may avoid scouring those nodes for user information for the user. Such a determination may be based on historic results. For example, when a branch has returned a negative result, i.e., no user information was found at that location in a previous search, this result can be stored and fed back to a search device, thus providing an additional learning component for a machine-learning system. Accordingly, the present system enhances the efficiency of user information searches by focusing on those areas most likely to contain user information while de-emphasizing those areas that likely do not contain user information. Such a system balances the desire to locate user information for the user with the cost of a traversal of every node of an online network. That is, the reward model determines which particular search paths should be used to check for user information given an expense in terms of time taken to find the user information and the breadth and depth of a user's outreach on the online network.

Figure 2:
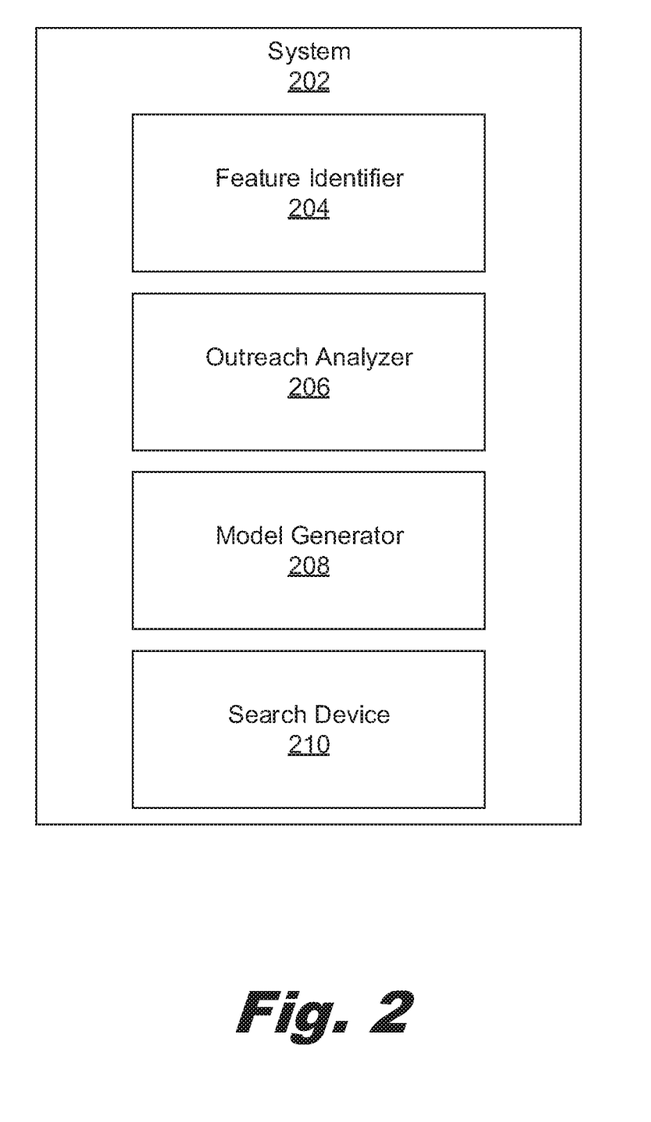
FIG. 2 depicts a system for generating an online-outreach-based reward model for user information search, according to an example of the principles described herein.

FIG. 2 depicts a system (202) for generating an online-outreach-based reward model for user information search, according to an example of the principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the engine. Each of the components may include its own processor, but one processor may be used by all the components. For example, each of the components may include a processor and memory. Alternatively, one processor may execute the designated function of each of the components.

The system (202) includes a feature identifier (204). The feature identifier (204) determines a set of features which are indicative of an online outreach for a user, which outreach originates from a particular online network. For example, certain features of an online network presence may be more indicative of others of a user's online outreach. The larger an online outreach for a user, the more expansive a search for their user information is likely to be. That is, the more a user comments about articles on the online network, the more likely that those comments where shared, or that the user has commented on other articles. Accordingly, based on historic information and/or based on machine-learning, the feature identifier (204) may identify features related to an online presence of a user, and may identify correlations between those features and an outreach of a user's online presence. As described above, such features may depend on the online network, and may be set, for example, by an administrator. That is, different social networking sites may weight differently the type of connection as it relates to a likely dissemination of user information. For example, within a social networking site, a type of connection, i.e., family vs. professional, may be more closely indicative of a level of online outreach whereas demographic information of a user may be more closely indicative of a level of online outreach for a professional networking site.

The system (202) also includes an outreach analyzer (206) to determine a user's online outreach. Such a determination is based on the identified set of features. For example, those features that are most strongly correlated to an online outreach for a user may form a set. Using these search criteria, values associated with the features may be collected relative to the user's presence in the online outreach. Specifically, if number of connections, demographics, number of posts, and number of communications are identified as the features that are indicative of online outreach, values associated with each of these features can be acquired by the outreach analyzer (206). While specific reference is made to a few particular features and associated values, note that any type and quantity of features and associated values may be used by the outreach analyzer (206) to determine the online outreach for a particular user.

The system (202) also includes a model generator (208) to generate a reward model based on the online outreach for a particular user. That is, specific characteristics of an online outreach may indicate which types of nodes are more likely to contain user information for a user. Thus, by analyzing the online outreach determined by the outreach analyzer (206), a customized reward model can be generated which predicts those connections most likely to yield results. As a specific example, the outreach analyzer (206) may determine that a user has many familial relationships, and relatively few professional relationships. Moreover, the outreach analyzer (206) may determine that within the familial relationships, the user frequently comments, posts, shares, and likes other posts whereas such action is not historically done by the user regarding the professional relationships. Thus, the reward model may indicate that user information is more likely to be found on nodes associated with the familial contacts as compared to a likelihood of finding user information on nodes associated with professional contacts.

In some examples, the model generator (208) is a machine-learning model generator (208). That is, the model generator (208) can employ machine-learning in analyzing the online outreach for a user to derive the reward model. For example, over time specific trends may develop overtime with regards to an online outreach, and what search parameters are most effective in discovering user information for a user to be deleted. Accordingly, the model generator (208) may access databases of previous search results which indicate which nodes/locations have contained user information and the online outreach for corresponding users. With these correlations, the model generator (208) can learn patterns and can therefore determine that for a given online outreach, what search parameters, or search paths, are likely to identify user information for a user. In one particular example, the model generator (208) may employ a random forest learning operation to improve model generation based on a given online outreach. The random forest is an ensemble learning method for classification, regression and other tasks. In a random forest learning model, a multitude of decision trees are constructed during a training phase and outputs a class that is a mode of the class or a prediction of the individual trees. Random forests correct for decision tree habit of overfitting to the training set. Decision trees refer to a method for various machine learning tasks. However, decision trees that are grown very deep tend to learn highly irregular patterns: they overfit their training sets, i.e. have low bias, but very high variance. Random forests average multiple deep decision trees, trained on different parts of the same training set, with the goal of reducing the variance. That is, the model generator (208) may generate a reward model that is a stochastic model based on prior behavior of the user across the particular online network.

The system (202) also includes a search device (210) to search for user information on the particular online network based on the reward model. That is, the search device (210), based on a number of search parameters, scours the nodes of the online network searching for user information for a particular user. In some examples, the search parameters include particular nodes to examine and particular paths between nodes. As the reward model has identified nodes and edges, i.e., a search path, that is likely to yield results, the search device (210) searches based on the rewards model by scouring those nodes and edges that are indicated in the reward model. Accordingly, in this fashion, a search stratagem that is tailored to a particular user's involvement in an online network is developed. Then, rather than level-order traversing each node and edge on the graph that represents the online network which can be ineffective, difficult, and time consuming, just those nodes and edges that are likely to produce valid results are searched for user information.

Figure 3:
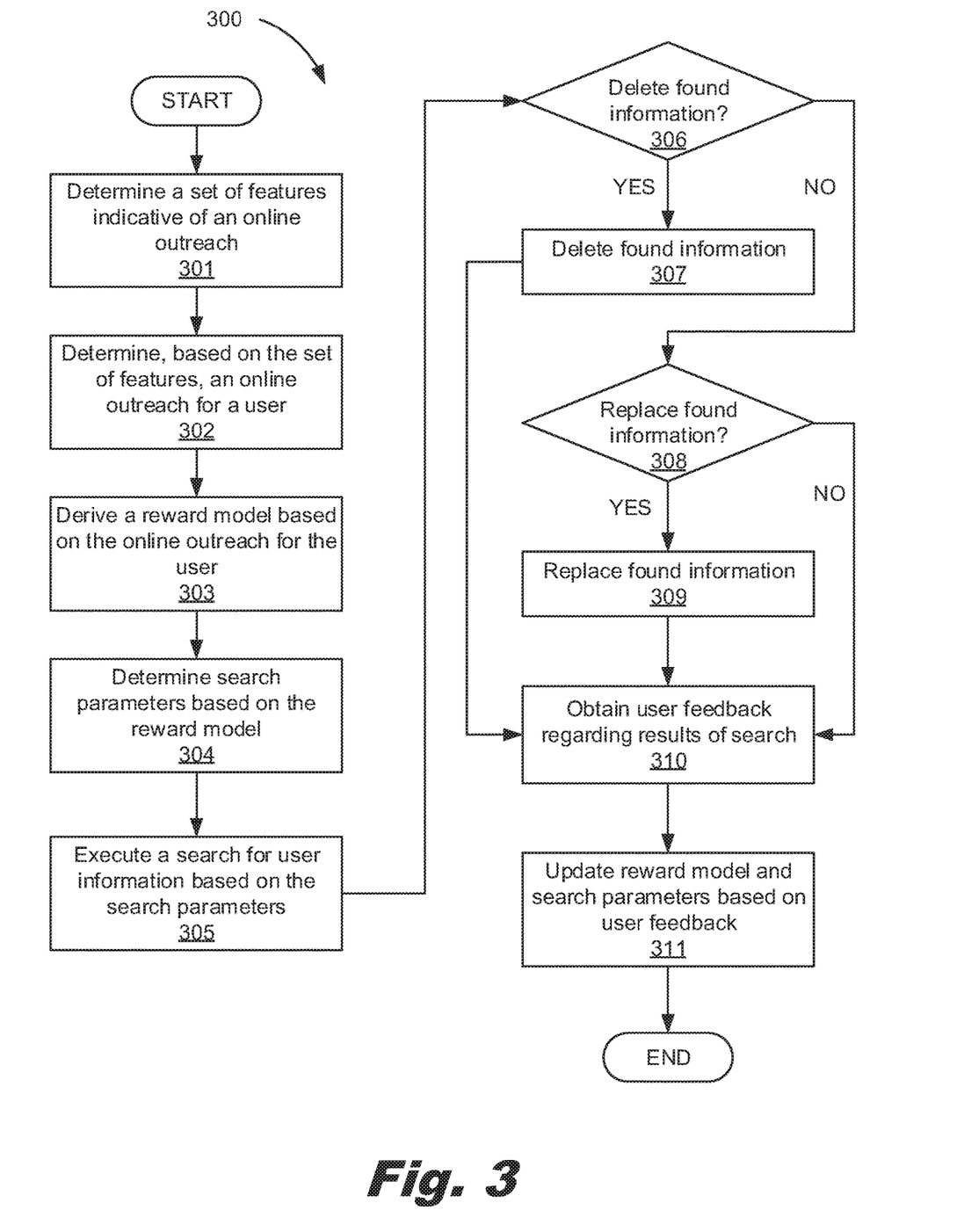
FIG. 3 depicts a flowchart of a method for generating an online-outreach-based reward model for user information search, according to an example of the principles described herein.

FIG. 3 depicts a flowchart of a method (300) for generating an online-outreach-based reward model for user information search, according to an example of the principles described herein. According to the method (300) a set of features indicative of an online outreach are determined (block 301) and an actual online outreach for a user determined (block 302) based on the set of features. Still further, a reward model is derived (block 303) based on the online outreach for the user. In some examples, this may be performed as described above in regards to FIG. 1.

In some examples search parameters are determined (block 304) based on the search model. For example, as described above, search parameters may indicate which nodes and which edges should be traversed to discover user information. This may be referred to as a search path, or a search fork. As described above, the nodes may refer to locations where user information is potentially stored. Accordingly, the search device (FIG. 2, 210) may extract information from the model generator (FIG. 2, 208) which indicates the node and edges to scour. The search device (FIG. 2, 210) may then execute (block 305) a search for the user information based on these search parameters. That is, the search device (FIG. 2, 210) may scan nodes indicated by the search parameters, which have been set based on the reward model, and may avoid scanning nodes indicated by the search parameters.

Upon detection of user information, the system (FIG. 2, 202) determines (block 306) whether to delete the user information or not. If it is determined to delete the user information (block 306, determination YES), the user information is deleted (block 307). By comparison, if it is determined not to delete the user information (block 306, determination NO), other measures can be taken to protect the user information of the user. That is to say, that if it is determined to not delete the user information (block 306, determination NO), it does not mean that the user's user information is not protected. In addition to deleting the user information, there may be other ways to protect the user information that has disseminated throughout an online network. For example, the user information could be replaced with some other data. Accordingly, the system determines (block 308) whether to replace the user information with some placeholder. If it is determined to replace the user information with a placeholder (block 308, determination YES), there are any number of placeholders that could be replaced. For example, the system (FIG. 2, 202) may replace (block 309) the user information with a tag indicating the type of user information. In another example, the system (FIG. 2, 202) may replace (block 309) the user information with a generated value. For example, rather than displaying a user's name, a generic name such as "John Doe" could be inserted into the space, thus preserving the security desired by the user.

In the case that the user information is not replaced (block 308, determination NO), it is not to say that the data again is unprotected. For example, in some cases, the user information may be encrypted such that it is not-readable by any potentially malicious application. As it is encrypted, the data is not at risk of discovery and therefore could be left alone. Accordingly, a risk model may indicate that the encrypted data is not at risk for disclosure and is thus protected and therefore not deleted nor replaced. Doing so may save on user information deletion from a system as it is information that does not need to be deleted.

In any example, the method (300) may include obtaining (block 310) user feedback regarding the results of the search. Specifically, the user feedback may indicate that user information was not found during the search. That is, after the search has been performed, a user, during the normal course of using the online network, or a focused effort to discover user information, may discover a piece of user information. The user can then indicate, via a user interface of the system (FIG. 2, 202), that additional user information was found. Based on this feedback, the reward model and/or the search parameters may be updated (block 311). That is, the reward model could be updated to indicate that the particular search path along which the user information was found as a candidate location where user information may be found. In another example, during execution of the search for user information, failure to locate user information in a location identified by the reward model is still valuable. Specifically, the search parameters and/or reward model can be updated in response to such a failure to identify information. That is, the reward model indicates locations where user information is likely to be stored. However, if information is not found at one of those locations, the reward model can be adjusted to reflect that user information is less likely than originally established to be found at that location. In other words, in both cases, information found at a calculated location, or information not found at a calculated location, additional data is provided by which a learning model generator (FIG. 2, 208) can determine the reward model given a particular determined online outreach.

Figure 4:
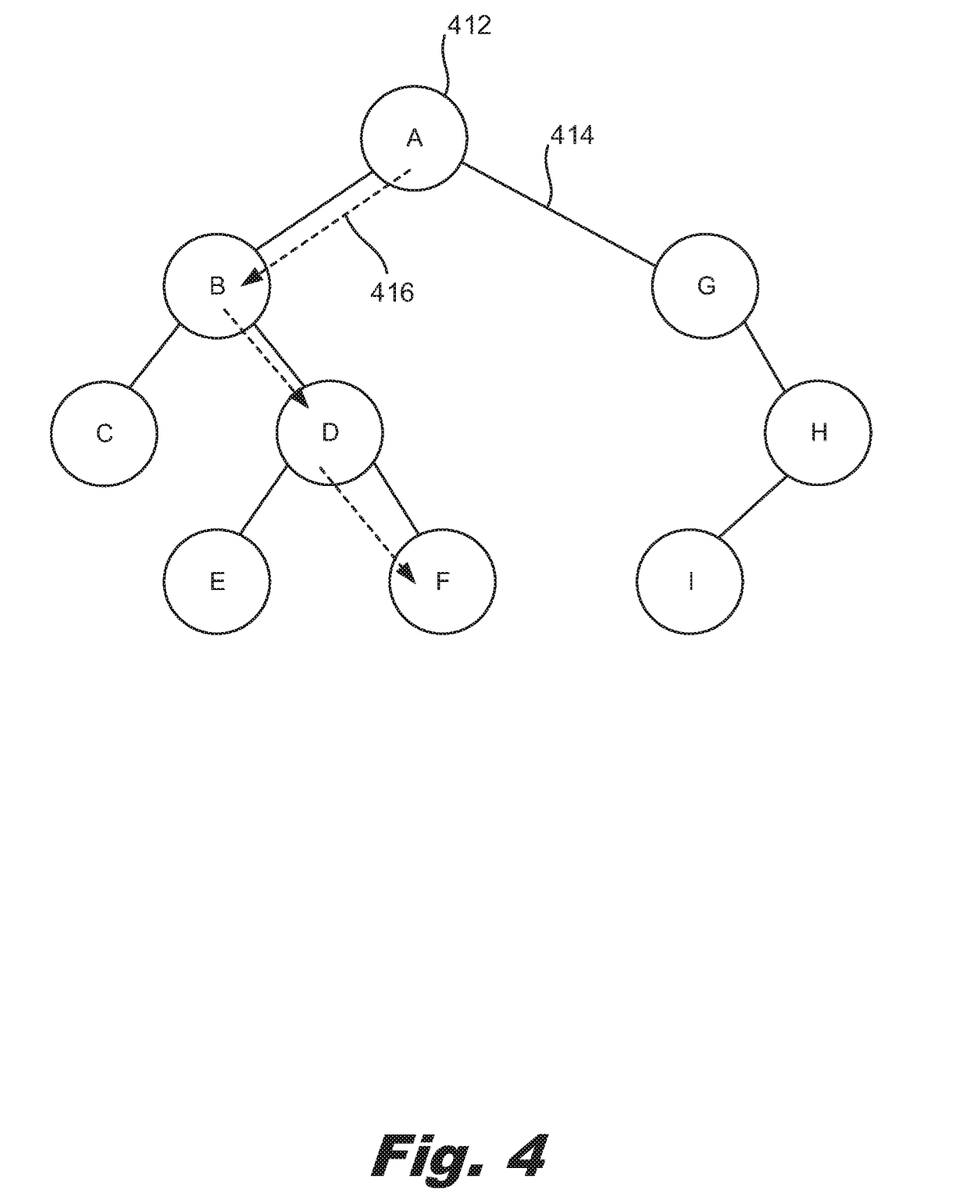
FIG. 4 depicts a search path determined by an online-outreach-based reward model, according to an example of principles described herein.

FIG. 4 depicts a search path (416) determined by an online-outreach-based reward model, according to an example of principles described herein. As described above, the online network may be represented as a graph having nodes (412) and edges (414). A node (412) refers to a location in the online network. A node (412) may be a location where user information of a user is located. For simplicity a single node (412) in the graph diagram is indicated with a reference number. An edge (414) refers to a connection from one node to another. That is, if a node (412) refers to a location on the online network, the edge (414) is a connector to a subsequent node (412) along which a piece of information, such as user information, may have traveled. For simplicity a single edge (414) in the graph diagram is indicated with a reference number.

As described above, the reward model determines a search path (416) by which a search device (FIG. 2, 210) scours an online network to discover user information for a user. For example, the reward model may indicate that based on a user's online outreach, nodes C and E are less likely to contain user information. Accordingly, the reward model may dictate search parameters that avoid scanning these nodes (412) for user information. This reduces the number of nodes (412) that are searched as compared to a level-order traversal which would scour each of the nodes depicted in FIG. 4.

Figure 5:
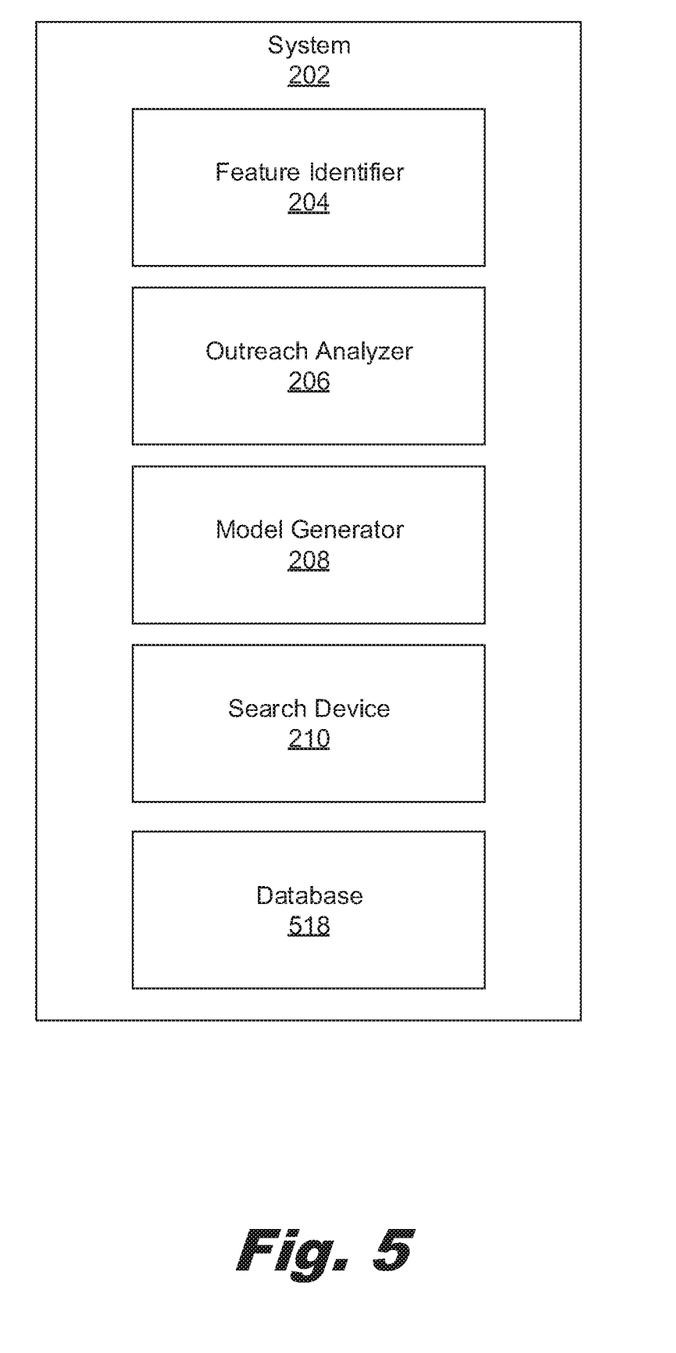
FIG. 5 depicts a system for generating an online-outreach-based reward model for user information search, according to an example of the principles described herein.

FIG. 5 depicts a system (202) for generating an online-outreach-based reward model for user information search, according to an example of the principles described herein. As described above, the system (202) includes a feature identifier (204), outreach analyzer (206), model generator (208), and search device (210). In some examples, the system (202) includes other components. For example, the system (202) includes a database (518) to store any determined reward model. As described above, the reward model may be based on historic information such as user feedback and past search results. Accordingly, the reward model may be stored in the database (518) such that it can continually be updated and improved to provide a more thorough search.

Figure 6:
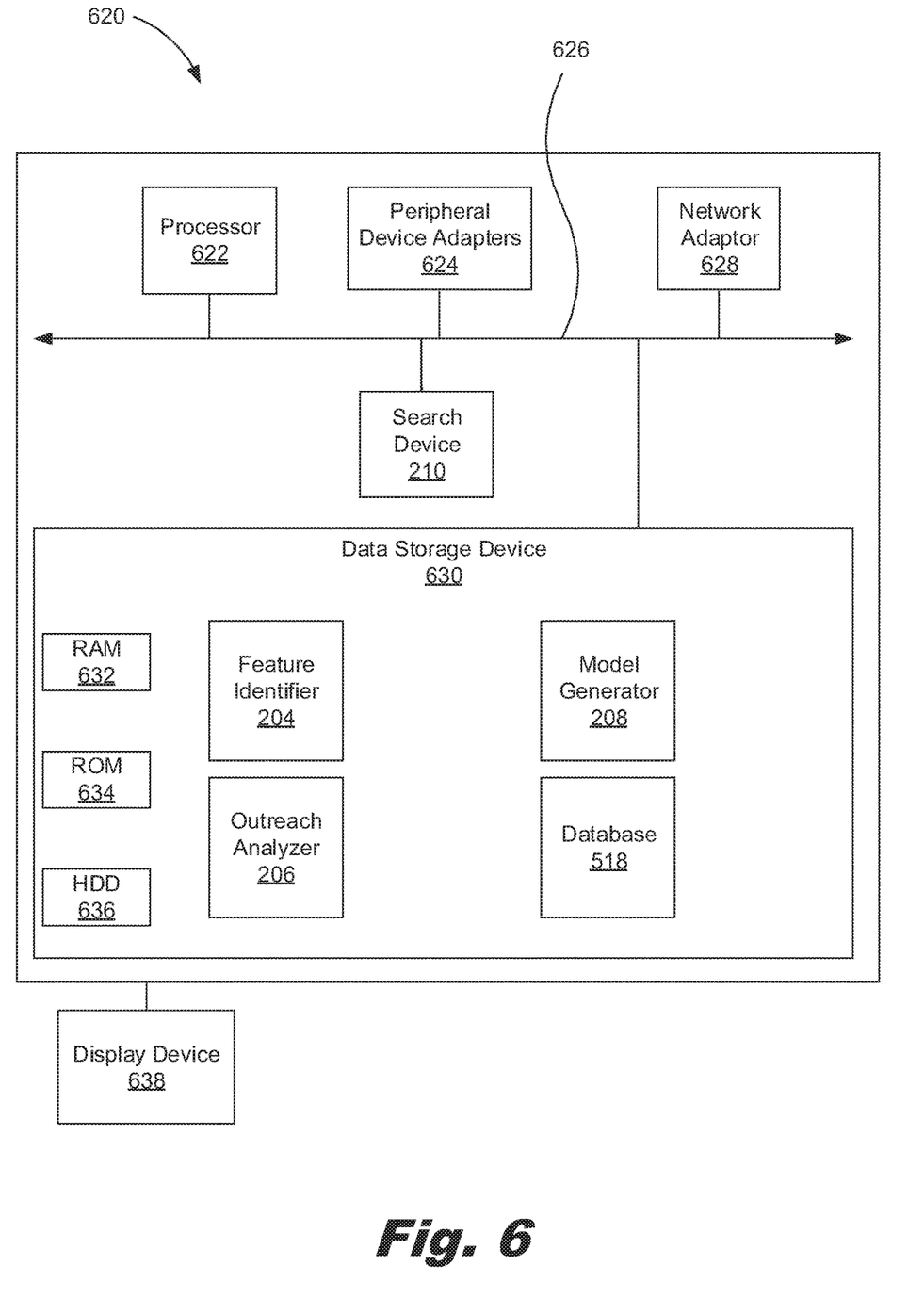
FIG. 6 is a diagram of a computing system for generating an online-outreach-based reward model for user information search, according to an example of the principles described herein.

FIG. 6 is a diagram of a computing system (620) for generating an online-outreach-based reward model for user information search, according to an example of the principles described herein. The computing device (620) may be implemented in an electronic device. Examples of electronic devices include servers, desktop computers, laptop computers, user digital assistants (PDAs), mobile devices, smartphones, gaming systems, and tablets, among other electronic devices.

The computing device (620) may be utilized in any data processing scenario including, stand-alone hardware, mobile applications, through a computing network, or combinations thereof. Further, the computing device (620) may be used in a computing network. In one example, the methods provided by the computing device (620) are provided as a service over a network by, for example, a third party.

To achieve its desired functionality, the computing device (620) includes various hardware components. Among these hardware components may be a number of processors (622), a number of data storage devices (630), a number of peripheral device adapters (624), and a number of network adapters (628). These hardware components may be interconnected through the use of a number of busses and/or network connections. In one example, the processor (622), data storage device (630), peripheral device adapters (624), and a network adapter (628) may be communicatively coupled via a bus (626). First, the computing device (620) includes a search device (210) which refers to hardware used to scour nodes of an online network for user information for a user.

The processor (622) may include the hardware architecture to retrieve executable code from the data storage device (630) and execute the executable code. The executable code may, when executed by the processor (622), cause the processor (622) to implement at least the functionality of generating an online outreach-based reward model. The functionality of the computing device (620) is in accordance to the methods of the present specification described herein. In the course of executing code, the processor (622) may receive input from and provide output to a number of the remaining hardware units.

The data storage device (630) may store data such as executable program code that is executed by the processor (622) or other processing device. As will be discussed, the data storage device (630) may specifically store computer code representing a number of applications that the processor (622) executes to implement at least the functionality described herein.

The data storage device (630) may include various types of memory modules, including volatile and nonvolatile memory. For example, the data storage device (630) of the present example includes Random Access Memory (RAM) (632), Read Only Memory (ROM) (634), and Hard Disk Drive (HDD) memory (636). Many other types of memory may also be utilized, and the present specification contemplates the use of many varying type(s) of memory in the data storage device (630) as may suit a particular application of the principles described herein. In certain examples, different types of memory in the data storage device (630) may be used for different data storage needs. For example, in certain examples the processor (622) may boot from Read Only Memory (ROM) (634), maintain nonvolatile storage in the Hard Disk Drive (HDD) memory (636), and execute program code stored in Random Access Memory (RAM) (632).

The data storage device (630) may include a computer readable medium, a computer readable storage medium, or a non-transitory computer readable medium, among others. For example, the data storage device (630) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (624, 628) in the computing device (620) enable the processor (622) to interface with various other hardware elements, external and internal to the computing device (620). For example, the peripheral device adapters (624) may provide an interface to input/output devices, such as, for example, display device (638), a mouse, or a keyboard. The peripheral device adapters (624) may also provide access to other external devices such as an external storage device, a number of network devices such as, for example, servers, switches, and routers, client devices, other types of computing devices, and combinations thereof.

The display device (638) may be provided to allow a user of the computing device (620) to interact with and implement the functionality of the computing device (620). The peripheral device adapters (624) may also create an interface between the processor (622) and the display device (638), a printer, or other media output devices. The network adapter (628) may provide an interface to other computing devices within, for example, a network, thereby enabling the transmission of data between the computing device (620) and other devices located within the network.

The computing device (620) may, when executed by the processor (622), display the number of graphical user interfaces (GUIs) on the display device (638) associated with the executable program code representing the number of applications stored on the data storage device (630). Examples of display devices (536) include a computer screen, a laptop screen, a mobile device screen, a user digital assistant (PDA) screen, and a tablet screen, among other display devices (536).

The computing device (620) further includes a number of modules used in the implementation of the systems and methods described herein. The various modules within the computing device (620) include executable program code that may be executed separately. In this example, the various modules may be stored as separate computer program products. In another example, the various modules within the computing device (620) may be combined within a number of computer program products; each computer program product including a number of the modules. As described above, the computing device (620) may include a feature identifier (204), outreach analyzer (206), model generator (208), and database (518).

Figure 7:
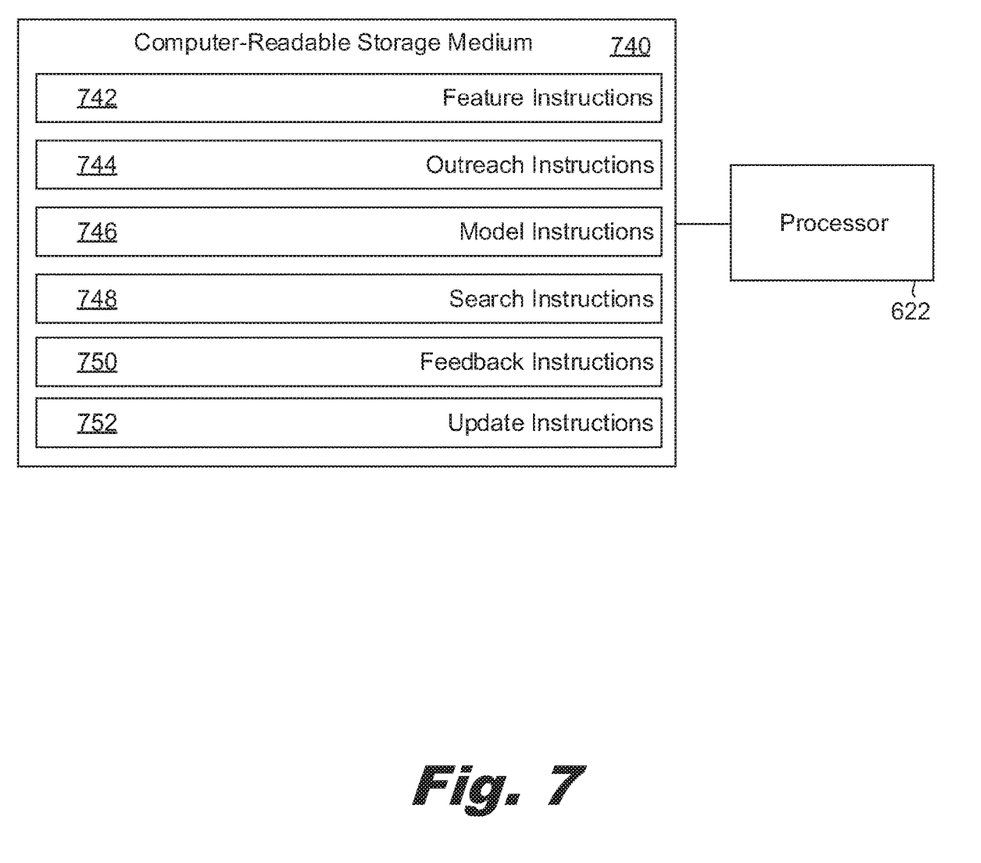
FIG. 7 depicts a computer readable storage medium for generating an online-outreach-based reward model for user information search, according to an example of principles described herein.

FIG. 7 depicts a computer readable storage medium (740) for generating an online-outreach-based reward model for user information search, according to an example of principles described herein. To achieve its desired functionality, a computing system includes various hardware components. Specifically, a computing system includes a processor (622) and a computer-readable storage medium (740). The computer-readable storage medium (740) is communicatively coupled to the processor (622). The computer-readable storage medium (740) includes a number of instructions (742, 744, 746, 748, 750, 752) for performing a designated function. The computer-readable storage medium (740) causes the processor (622) to execute the designated function of the instructions (742, 744, 746, 748, 750, 752).

Referring to FIG. 7, feature instructions (742), when executed by the processor (622), cause the processor (622) to determine a set of features which are indicative of an online outreach for a user originating from a particular online network. Outreach instructions (744), when executed by the processor (622), may cause the processor (622) to determine, based on the set of features, the online outreach for the user originating from a particular online network. Model instructions (746), when executed by the processor (622), may cause the processor (622) to derive a reward model based on the online outreach for the user. Search instructions (748), when executed by the processor (622), may cause the processor (622) to search for user information on the particular online network based on the reward model. Feedback instructions (750), when executed by the processor (622), may cause the processor (622) to receive user feedback regarding results of the search. Update instructions (752), when executed by the processor (622), may cause the processor (622) to update the reward model and search parameters based on the results.

In summary, such a system and method 1) focuses a search for user information to those locations most likely to contain such information; 2) enhances the efficiency of searches by avoiding searching in areas that are not likely to yield user information; and 3) tailors the search to the actions of a specific user. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining a set of features which are indicative of an online outreach, originating from a particular online social network, for a user;
   determining, based on the set of features, the online outreach originating from the particular online social network for the user, wherein the online outreach:
   indicates an extent to which the user's data permeates into the particular online social network; and indicates a degree to which the user interacts via the particular online social network;

deriving a reward model for a search for the user's data, which reward model defines a search strategy for the user's data on the particular online social network, the reward model being based on the online outreach for the user, which reward model indicates:

locations within the particular online social network to search for the user's data; and locations within the particular online social network to avoid searching for the user's data; and removing from the reward model of the particular online social network, a node that historically has returned a negative result where no user information was found at the node of the particular online social network in a previous search.

2. The computer-implemented method of claim 1, wherein the reward model indicates locations where the user's data is likely to be found.

3. The computer-implemented method of claim 1, further comprising:

determining search parameters to search for the user's data on the particular online social network; and searching for the user's data at locations within the particular online social network indicated by the reward model and based on the search parameters.

4. The computer-implemented method of claim 3, further comprising:

obtaining user feedback regarding results of the search; and updating the reward model and search parameters based on the user feedback.

5. The computer-implemented method of claim 3, further comprising updating the search parameters in response to a failure to locate the user's data at a location identified in the reward model.

6. The computer-implemented method of claim 3, further comprising determining, based on a risk model, whether to delete the user's data found during execution of the search.

7. The computer-implemented method of claim 3, further comprising deleting the user's data found during execution of the search.

8. The computer-implemented method of claim 3, further comprising replacing the user's data found during execution of the search with a tag indicating a type of the user's data.

9. The computer-implemented method of claim 3, further comprising replacing the user's data found during execution of the search with a generated value.

10. The computer-implemented method of claim 1, wherein the reward model is further derived based on access settings for the user which indicate which nodes do not have access rights to their information.

11. The computer-implemented method of claim 1, wherein the reward model also indicates locations outside the particular online social network to search for the user's data.

12. The computer-implemented method of claim 1, wherein the user's data comprises profile information for the user, remarks made by the user, and associated metadata.

13. The computer-implemented method of claim 1, wherein determining the online outreach for the user comprises determining a value associated with each feature of the set of features which are indicative of an online outreach.

14. The computer-implemented method of claim 1, further comprising weighting the features of the set of features as it relates to a likely dissemination of the user's data, wherein weights are based on the type of online social network.

15. A system comprising:

a feature identifier to determine, for a user, a set of features which are indicative of:

how far into a particular online social network, the user's data is likely to extend;

an outreach analyzer to, based on the set of features:

determine, for the user, values associated with each feature;

determine, from the values associated with each feature, an online outreach, originating from the particular online social network, for the user, wherein the online outreach indicates:

a degree to which the user participates in the particular online social network; and an extent to which the user's data permeates into the particular online social network;

a model generator to:

derive a reward model for a search of the user's data, which reward model defines a search strategy for the user's data on the particular online social network the reward model being based on the online outreach for the user, which reward model indicates:

locations within the particular online social network to search for the user's data; and locations within the particular online social network to avoid searching for the user's data; and remove from the reward model of the particular online social network, a node that historically has returned a negative result where no user information was found at the node of the particular online social network in a previous search;

a search device to search for the user's data on the particular online social network based on the reward model.

16. The system of claim 15, wherein the model generator is a machine-learning model generator.

17. The system of claim 15, wherein the reward model identifies a search path that indicates locations on the particular online social network most likely to contain the user's data.

18. A computer program product, the computer program product comprising a computer readable storage medium having program instructions embodied therewith, the program instructions executable by a processor to cause the processor to:

determine a set of features, for a user, which are indicative of: an online outreach for a user, wherein the online outreach indicates:

a degree to which the user participates in a particular online social network; and how far into the particular online social network the user's profile information, remarks, and associated metadata is likely to extend;

determine, for the user, values associated with each feature;

determine, from the values associated with each feature, the online outreach for the user originating from the particular online social network, wherein:

the particular online social network is represented as a graph with nodes and edges;

each node has a payoff distribution indicating prior success at finding information at that node of the particular online social network;

the online outreach indicates an extent to which the user's profile information, remarks, and associated metadata permeates into the particular online social network;

the set of features comprises a feature indicating a dissemination of the user's posts to nodes of the particular online social network;

the set of features comprises a feature indicating for each connection, whether the connection is a familial or professional relationship, wherein a familial relationship is more likely to include the user's profile information, remarks, and associated metadata;

the set of features indicates a connectedness of the particular online social network to other online social networks; and the set of features is specific to the particular online social network;

derive a reward model for a search for the user's profile information, remarks, and associated metadata, which reward model defines a search strategy for the user's profile information, remarks, and associated metadata on the particular online social network, the reward model being based on the online outreach for the user, which reward model:

predicts locations within the particular online social network likely to contain the user's profile information, remarks, and associated metadata;

indicates locations within the particular online social network to search for the user's profile information, remarks, and associated metadata;

indicates locations within the particular online social network to avoid searching for the user's profile information, remarks, and associated metadata; and comprises a node within a second online network outside the particular online social network based on a connection of the user historically sharing information from the particular online social network to the second online network;

remove from the reward model of the particular online social network:

a first node that historically has returned a negative result where no user information was found at the node of the particular online social network in a previous search; and a second node of the particular online social network for which the user has prohibited access to the user's data;

search for the user's profile information, remarks, and associated metadata on the particular online social network based on the reward model;

receive user feedback regarding results of the search, and update the reward model and search parameters based on the results.

19. The computer program product of claim 18, wherein updating the search parameters is based on past search results.

20. The computer program product of claim 18, wherein the set of features comprises at least one element selected from the group consisting of:

network connections;
connection type;
network interaction; and
network interconnectedness.

* * * * *